(12) United States Patent
Hsu et al.

(10) Patent No.: US 7,369,709 B2
(45) Date of Patent: May 6, 2008

(54) CONDITIONAL LAPPED TRANSFORM

(75) Inventors: Pohsiang Hsu, Redmond, WA (US); Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 102 days.

(21) Appl. No.: 10/931,885

(22) Filed: Aug. 31, 2004

(65) Prior Publication Data
US 2005/0053150 A1    Mar. 10, 2005

Related U.S. Application Data

(60) Provisional application No. 60/501,081, filed on Sep. 7, 2003.

(51) Int. Cl.
  G06K 9/36    (2006.01)
  G06K 9/40    (2006.01)
  G06K 9/46    (2006.01)
  H04B 1/66    (2006.01)
  H04N 7/12    (2006.01)
  H04N 11/02   (2006.01)
  H04N 11/04   (2006.01)

(52) U.S. Cl. .................. 382/248; 382/233; 382/261; 375/240.18

(58) Field of Classification Search .......... 382/166, 382/261, 233, 236, 239, 248; 375/240, 240.1, 375/240.18, 240.01
See application file for complete search history.

(56) References Cited

U.S. PATENT DOCUMENTS

| | | | |
|---|---|---|---|
| 4,754,492 A | 6/1988 | Malvar | |
| 5,297,236 A | 3/1994 | Antill et al. | |
| 5,311,310 A | 5/1994 | Jozawa et al. | |
| 5,384,849 A | 1/1995 | Jeong | |
| 5,805,739 A | 9/1998 | Malvar et al. | |
| 5,850,294 A * | 12/1998 | Apostolopoulos et al. | 358/426.14 |
| 5,859,788 A | 1/1999 | Sheng | |
| 5,933,541 A * | 8/1999 | Kutka et al. | 382/261 |
| 5,970,173 A | 10/1999 | Lee et al. | |
| 5,973,755 A | 10/1999 | Gabriel | |

(Continued)

FOREIGN PATENT DOCUMENTS

AU    7351001    1/2002

(Continued)

OTHER PUBLICATIONS (Submitted as part of the IDS) Tran et al. ("Lapped Transform via Time-Domain Pre- and Post-Filtering", IEEE Transaction on Signal Processing, vol. 51, No. 6, Jun. 2003).*

(Continued)

Primary Examiner—Yubin Hung
(74) Attorney, Agent, or Firm—Klarquist Sparkman, LLP

(57) ABSTRACT

A digital media content (e.g., image, video, audio, etc.) encoder/decoder employs a spatially varying parameter to condition the application of an overlap pre-process and post-process to adjacent transform block edges for the spatial-domain lapped transform. This conditional application of the lapped transform to sub-blocks of the digital media can be signaled on an edge, block, macro-block or other granularity. Further, a restriction on use of the conditional lapped transform based on a frame-level quantization or other bit-rate related parameter minimizes the signaling overhead impact at low bit-rates of coding.

15 Claims, 7 Drawing Sheets

U.S. PATENT DOCUMENTS

| | | | |
|---|---|---|---|
| 5,982,459 | A | 11/1999 | Fandrianto et al. |
| 6,029,126 | A | 2/2000 | Malvar |
| 6,073,153 | A | 6/2000 | Malvar |
| 6,101,279 | A | 8/2000 | Nguyen et al. |
| 6,115,689 | A | 9/2000 | Malvar |
| 6,154,762 | A | 11/2000 | Malvar |
| 6,253,165 | B1 | 6/2001 | Malvar |
| 6,307,887 | B1 | 10/2001 | Gabriel |
| 6,324,560 | B1 | 11/2001 | Malvar |
| 6,370,502 | B1 | 4/2002 | Wu et al. |
| 6,393,061 | B1 | 5/2002 | Owechko |
| 6,393,156 | B1 | 5/2002 | Nguyen et al. |
| 6,421,464 | B1 | 7/2002 | Tran et al. |
| 6,487,574 | B1 | 11/2002 | Malvar |
| 6,496,795 | B1 | 12/2002 | Malvar |
| 6,728,315 | B2 | 4/2004 | Haskell et al. |
| 6,728,316 | B2 * | 4/2004 | Enficiaud et al. ...... 375/240.19 |
| 6,763,068 | B2 * | 7/2004 | Oktem ................. 375/240.03 |
| 6,771,828 | B1 | 8/2004 | Malvar |
| 6,771,829 | B1 | 8/2004 | Topiwala et al. |
| 6,865,229 | B1 * | 3/2005 | Pronkine ............... 375/240.29 |
| 7,006,699 | B2 | 2/2006 | Malvar |
| 7,050,504 | B2 * | 5/2006 | Joch et al. ............. 375/240.26 |
| 7,155,065 | B1 | 12/2006 | Malvar |
| 7,167,522 | B2 * | 1/2007 | Webb .................... 375/240.29 |
| 2002/0118759 | A1 | 8/2002 | Enficiaud et al. |
| 2003/0128756 | A1 | 7/2003 | Oktem |
| 2003/0152146 | A1 | 8/2003 | Lin |
| 2003/0206582 | A1 | 11/2003 | Srinivasan |
| 2005/0013359 | A1 | 1/2005 | Srinivasan |
| 2006/0133684 | A1 | 6/2006 | Srinivasan et al. |

FOREIGN PATENT DOCUMENTS

| | | |
|---|---|---|
| WO | WO 02/07438 | 1/2002 |

OTHER PUBLICATIONS

Bhaskaran et al. ("Image and Video Compression Standards Algorithms and Architectures," 2nd ed., 1997, pp. 192-194).*

Bhaskaran et al. ("Image and Video Compression Standards Algorithms and Architectures," 2nd ed., 1997, pp. 192-194).*

U.S. Appl. No. 60/341,674, filed Dec. 17, 2001, Lee et al.

U.S. Appl. No. 60/488,710, filed Jul. 18, 2003, Srinivasan et al.

Malvar, *Signal Processing with Lapped Transforms*, Artech House, Norwood, MA, pp. iv, vii-xi, 175-219, 264-273, and 353-357 (1992).

Tran, "Lapped Transform via Time-Domain Pre- and Post-Processing," 2001 Conference on Information Sciences and Systems, The Johns Hopkins University, Mar. 21-23, 2001.

International Organization for Standardisation, ISO/IEC JTC1/SC29/WG11 N4668, "Coding of Moving Pictures and Audio," Mar. 2002, Title: MPEG-4 Overview—(V.21—Jeju Version), Editor: Rob Koenen (rob.koenen@m4if.org), available at http://www.chiariglione.org/mpeg/standards/mpeg-4/mpeg-4.htm.

"H.264 & IPTV Over DSL—Enabling New Telco Revenue Opportunities," *White Paper*, Intel/Envivio, May 15, 2004, available at http://www.envivio.com/images/products/H264whitepaper.pdf.

Park et al., "A post processing method for reducing quantization effects in low bit-rate moving picture coding," *IEEE Trans. Circuit Syst.*, Video Technol., vol. 9, pp. 161-171, Feb. 1999.

Apostolopoulos et al., "Post-processing for very-low-bit-rate video compression," *IEEE Trans. Image Processing*, vol. 8, pp. 1125-1129, Aug. 1999.

Tran et al., "Lapped transform based video coding," *Proc. SPIE Applicat. Digital Image Processing XXIV*, San Diego, CA, pp. 319-333, Aug. 2001.

Tu et al., "Context-Based Entropy Coding of Block Transform Coefficients for Image Compression," *IEEE Transactions On Image Processing*, vol. 11, No. 11, pp. 1271-1283, Nov. 2002.

de Queiroz et al., "Lapped transforms for image compression," *The Handbook on Transforms and Data Compression*, edited by K. R. Rao and P. Yip, CRC Press, pp. 197-265, Oct. 2000.

de Queiroz et al., "Time-Varying Lapped Transforms and Wavelet Packets," *IEEE Transactions on Signal Processing*, vol. 41, No. 12, pp. 3293-3305 (1993).

Malvar, "Lapped Transforms for Efficient Transform/Subband Coding," *IEEE Transactions on Acoustics, Speech and Signal Processing*, vol. 38, No. 6, pp. 969-978 (1990).

Malvar, "Biorthogonal and Nonuniform Lapped Transforms for Transform Coding with Reduced Blocking and Ringing Artifacts," appeared in *IEEE Transactions on Signal Processing, Special Issue on Multirate Systems, Filter Banks, Wavelets, and Applications*, vol. 46, 29 pp. (1998).

Shlien, "The Modulated Lapped Transform, Its Time-Varying Forms, and Its Applications to Audio Coding Standards," *IEEE Transactions on Speech and Audio Processing*, vol. 5, No. 4, pp. 359-366 (Jul. 1997).

Joint Video Team (JVT) of ISO/IEC MPEG & ITU-T VCEG, "Joint Final Committee Draft (JFCD) of Joint Video Specification," JVT-D157, 207 pp. (Aug. 2002).

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005).

Tran et al., "Lapped Transform via Time-Domain Pre- and Post-Filtering", *IEEE Transactions on Signal Processing*, vol. 51, No. 6, pp. 1557-1571 (Jun. 2003).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video1," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Ahmd et al., "Discrete Cosine Transform," IEEE Transactions on Computers, C-23 (Jan. 1974), pp. 90-93.

Goel et al., "Pre-processing for MPEG Compression Using Adaptive Spatial Filtering," Proceedings of 1995 IEEE International Conference on Consumer Electronics, 1995, pp. 246-247.

International Search report for PCT/US04/28969, completed Jul. 11, 2006, 4 pages.

Jain, "Fundamentals of Digital Image Processing," Chapters 2, 5, and 11, Prentice Hall, 189 pp. (1989).

Paeth, "A Fast Algorithm for General Raster Rotation," Proceedings of Graphics Interface '86, pp. 77-81, May 1986.

Proposed SMPTE Standard for Television: VC-1 Compressed Video Bitstream Format and Decoding Process, pp. 1-500, (Aug. 2005).

Tanaka et al., "A Rotation Method for Raster Image Using Skew Transformation,"Proc IEEE Conf on Computer Vision and Pattern Recognition, pp. 272-277, Jun. 1986.

Wien, "Variable Block-Size Transforms for Hybrid Video Coding," Dissertation, 182 pp. (Feb. 2004).

* cited by examiner

Software 1080 Implementing Video
Encoder/Decoder With Conditional
Lapped Transform

CONDITIONAL LAPPED TRANSFORM

CROSS REFERENCE TO RELATED APPLICATIONS

This application claims the benefit of U.S. Provisional Patent Application Ser. No. 60/501,081, filed Sep. 7, 2003, the disclosure of which is incorporated herein by reference.

TECHNICAL FIELD

The present invention relates to techniques for digitally encoding, decoding and processing media content signals (e.g., audio, video, image, text, speech, etc.). The invention more particularly relates to digital media codecs based on lapped transforms.

BACKGROUND

Transform coding is a compression technique used in many audio, image and video compression systems. Uncompressed digital image and video is typically represented or captured as samples of picture elements or colors at locations in an image or video frame arranged in a two dimensional grid. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling.

Uncompressed digital image and video signals can consume considerable storage and transmission capacity. Transform coding reduces the size of digital images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain.

More specifically, a typical transform coding technique 100 shown in FIG. 1 divides the uncompressed digital image's pixels into fixed-size two dimensional blocks, each block possibly overlapping with other blocks. A linear transform 110 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized (i.e., reduced in resolution, such as by dropping least significant bits of the coefficient values or otherwise mapping values in a higher resolution number set to a lower resolution), and also entropy or variable-length coded into a compressed data stream by quantizer/entropy coder 120. After dequantization/entropy decoding 130, the transform coefficients will inversely transform 140 to nearly reconstruct the original color/spatial sampled image/video signal.

While compressing a still image (or an intra-coded frame in a video sequence), most common standards such as MPEG-2, MPEG-4 and Windows Media partition the image into square tiles and apply a block transform to each image tile. The transform coefficients in a given partition (commonly known as a block) are influenced only by the raw data components within the block. Irreversible or lossy operations on the encoder side such as quantization cause artifacts to appear in the decoded image. These artifacts are independent across blocks and produce a visually annoying effect known as the blocking effect. Likewise for audio data, when non-overlapping blocks are independently transform coded, quantization errors will produce discontinuities in the signal at the block boundaries upon reconstruction of the audio signal at the decoder. For audio, a periodic clicking effect is heard.

Spatial-Domain Lapped Transform

In order to minimize the blocking effect, cross block correlations can be exploited. One way of achieving cross block correlation is by using a lapped transform as described in H. Malvar, "Signal Processing with Lapped Transforms," Artech House, Norwood Mass., 1992. A lapped transform is a transform whose input spans, besides the data elements in the current block, a few adjacent elements in neighboring blocks. Likewise, on the reconstruction side the inverse transform influences all data points in the current block as well as a few data points in neighboring blocks.

For the case of 2-dimensional (2D) data, the lapped 2D transform is a function of the current block, together with select elements of blocks to the left, top, right, bottom and possibly top-left, top-right, bottom-left and bottom-right. The number of data points in neighboring blocks that are used to compute the current transform is referred to as the overlap.

The lapped transform can be implemented in the transform domain, as a step that merges transform domain quantities after a conventional block transform. Else, it can be implemented in the spatial-domain by a pre-processing stage that is applied to pixels within the range of overlap. These two implementations are mathematically related and therefore equivalent.

As shown in FIG. 2, the spatial-domain lapped transform (SDLT) 200 is a lapped transform that is implemented as matched pre and post processing steps 210, 220 prior to the forward block transform 110, and subsequent to the inverse block transform 140, respectively. (See, e.g., Srinivasan et al., "Improvements to the Spatial-Domain Lapped Transform in Digital Media Compression," U.S. patent application Ser. No. 10/620,744, filed Jul. 15, 2003 [hereafter "Improved SDLT Patent Application"].) The spatial-domain lapped transform is often used to retrofit existing block transform based compression techniques in order to improve efficiency.

SUMMARY

When the SDLT is applied to all parts of an image (such as a frame in a video sequence) of other digital media content being coded in a non-predicted (i.e., Intra) manner, certain limiting issues arise:

1. The pre-filter is range-expansive; therefore certain areas of the image may saturate or clip after pre-filter on the encoder side. Likewise, there may be overflow on the decoder side.
2. The pre-filter is sharpening. The coding efficiency of certain areas of an image with local high frequency content (especially image edges aligned with block edges) therefore will decrease as a result of the lapped transform.

The conditional lapped transform that is implemented using digital media signal processing and encoding/decoding techniques and systems described herein achieves better control of the overlap process to address these issues. This conditional lapped transform allows for spatial flexibility in the choice or application of the pre- and post-filters of a lapped transform. In other words, the lapped transform is conditionally applied to different areas of the digital media content (e.g., separate blocks of an image).

For example, one implementation of the conditional lapped transform described herein uses a spatially-varying mode parameter to specify the application and extent of the overlap post-filter to be applied upon decoding. In a video codec, for example, this spatially-varying mode parameter specifies to which block edges in an image the post-filter of the lapped transform is to be applied. In one implementation, the mode parameter is more efficiently coded and transmitted for intra-coded frames of a video sequence as a Boolean flag with macroblock granularity, which is more efficient than coding the mode parameter per block edge. Further, this implementation imposes a restriction on the conditional overlap mode based on a quantization parameter related to the bitrate, so as to minimize the impact of performing the conditional lapped transform at low bitrates.

Additional features and advantages of the invention will be made apparent from the following detailed description of embodiments that proceeds with reference to the accompanying drawings.

DETAILED DESCRIPTION

The following description is directed to implementations of the conditional lapped transform, in which block edge filters associated with the lapped transform are conditionally applied on a spatially varying basis over digital media content. An exemplary application of the conditional lapped transform is in an image or video encoder and decoder. However, this conditional form of spatial-domain lapped transform is not limited to image or video codecs, and can be applied to other media encoding, decoding and/or processing systems. Accordingly, the conditional lapped transform is described in the context of a generalized image or video encoder and decoder, but alternatively can be incorporated in various types of media signal encoding, decoding and/or processing systems (e.g., audio, video, image, etc.) that employ overlap filters of lapped transforms on a conditional or spatially-varying basis, whether in the spatial domain or transform domain.

1. Generalized Video Encoder and Decoder

Figure 3:
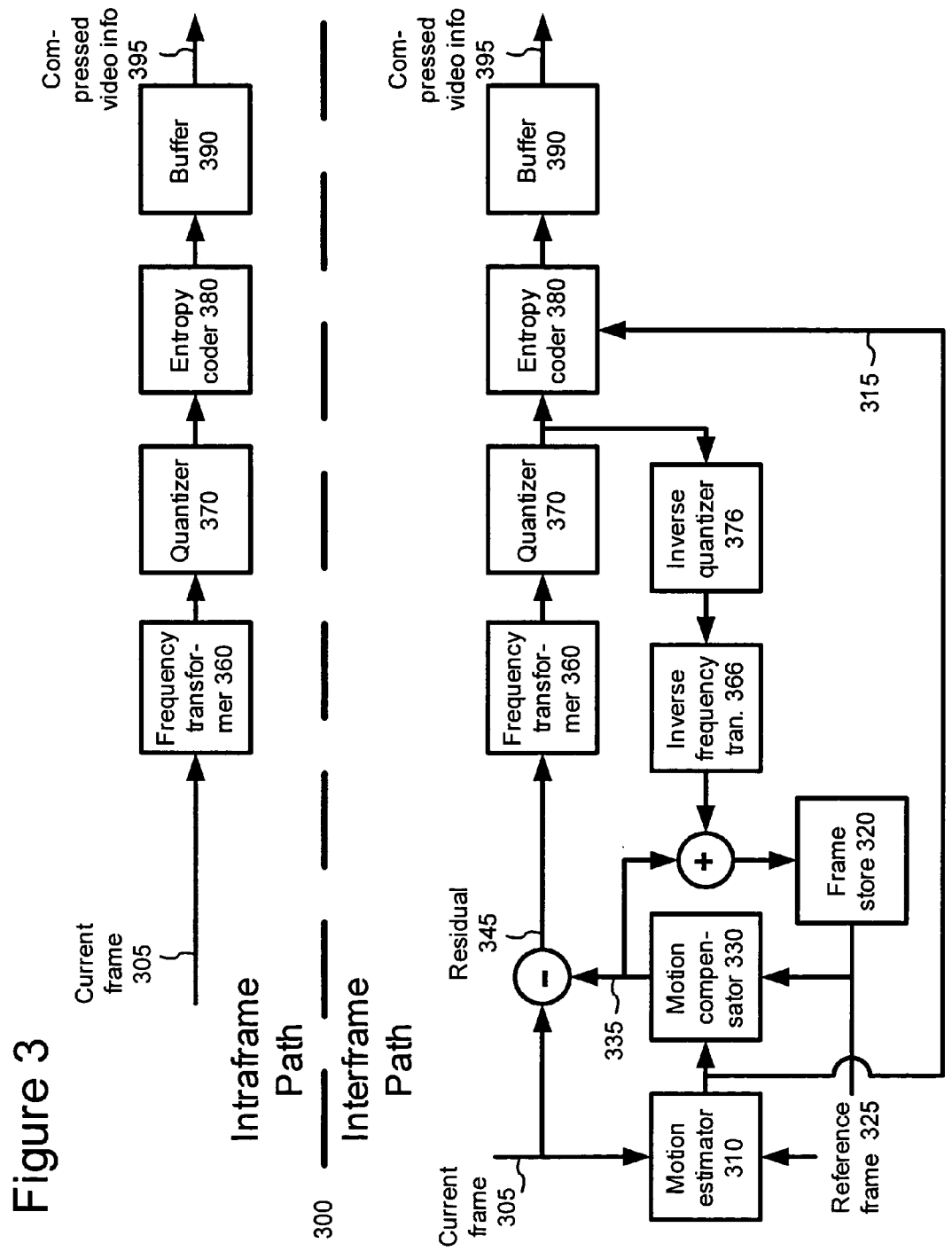
FIG. 3 is a block diagram of a video encoder employing the conditional lapped transform described herein.
Figure 4:
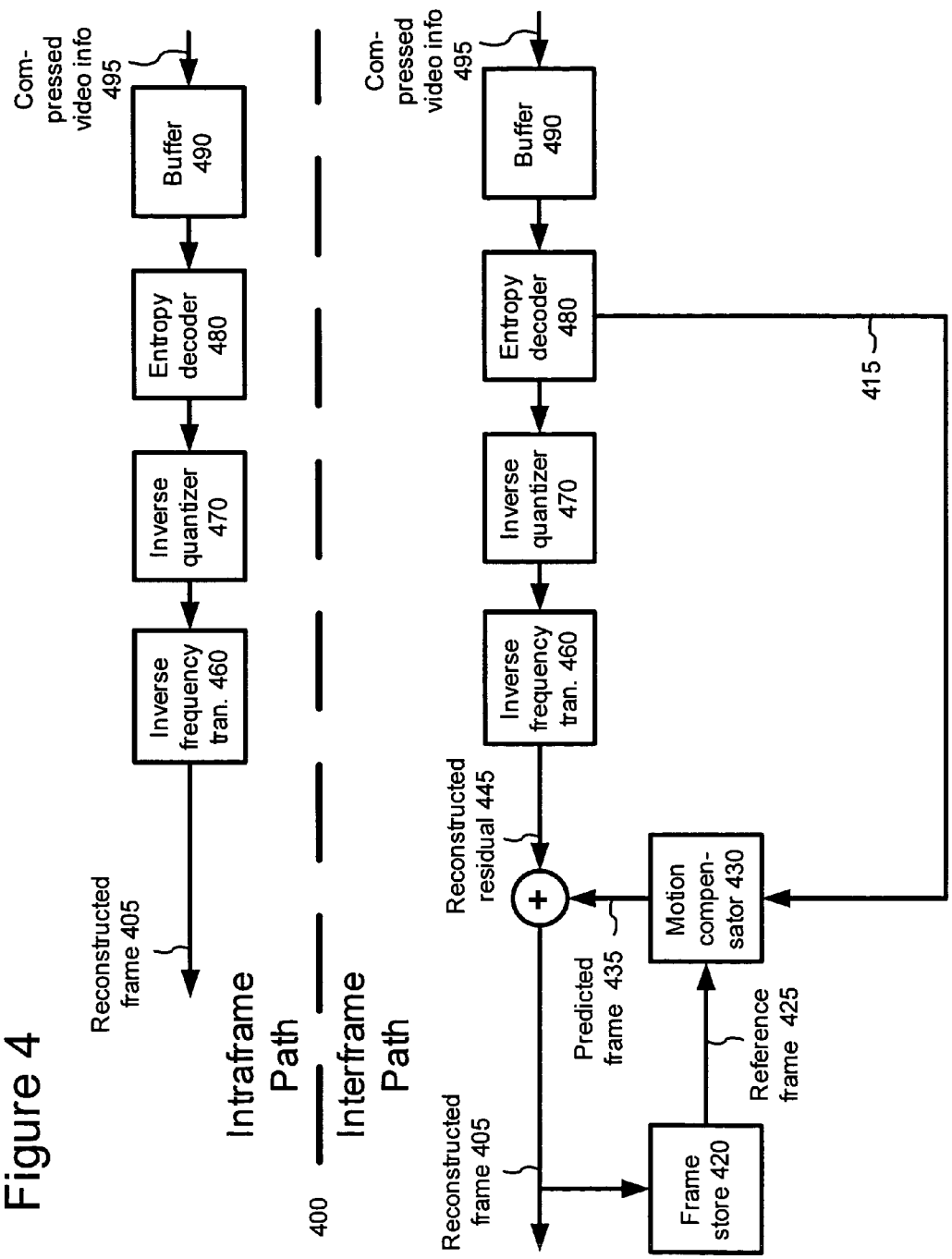
FIG. 4 is a block diagram of a video decoder employing the conditional lapped transform described herein.

FIG. 3 is a block diagram of a generalized video encoder (300) and FIG. 4 is a block diagram of a generalized video decoder (400), in which the WMV9NC-9 transforms can be incorporated.

The relationships shown between modules within the encoder and decoder indicate the main flow of information in the encoder and decoder; other relationships are not shown for the sake of simplicity. In particular, FIGS. 3 and 4 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

The encoder (300) and decoder (400) are block-based and use a 4:2:0 macroblock format with each macroblock including 4 luminance 8×8 luminance blocks (at times treated as one 16×16 macroblock) and two 8×8 chrominance blocks. Alternatively, the encoder (300) and decoder (400) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 3 is a block diagram of a general video encoder system (300). The encoder system (300) receives a sequence of video frames including a current frame (305), and produces compressed video information (395) as output. Particular embodiments of video encoders typically use a variation or supplemented version of the generalized encoder (300).

The encoder system (300) compresses predicted frames and key frames. For the sake of presentation, FIG. 3 shows a path for key frames through the encoder system (300) and a path for forward-predicted frames. Many of the components of the encoder system (300) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (305) is a forward-predicted frame, a motion estimator (310) estimates motion of macroblocks or other sets of pixels of the current frame (305) with respect to a reference frame, which is the reconstructed previous frame (325) buffered in the frame store (320). In alternative embodiments, the reference frame is a later frame or the current frame is bi-directionally predicted. The motion estimator (310) outputs as side information motion information (315) such as motion vectors. A motion compensator (330) applies the motion information (315) to the reconstructed previous frame (325) to form a motion-compensated current frame (335). The prediction is rarely perfect, however, and the difference between the motion-compensated current frame (335) and the original current frame (305) is the prediction residual (345). Alternatively, a motion estimator and motion compensator apply another type of motion estimation/compensation.

A frequency transformer (360) converts the spatial domain video information into frequency domain (i.e., spectral) data. For block-based video frames, the frequency transformer (360) applies a transform described in the following sections that has properties similar to the discrete cosine transform ["DCT"]. In some embodiments, the frequency transformer (360) applies a frequency transform to blocks of spatial prediction residuals for key frames. The frequency transformer (360) can apply an 8×8, 8×4, 4×8, or other size frequency transforms.

A quantizer (370) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (300) can use frame dropping, adaptive filtering, or other techniques for rate control.

When a reconstructed current frame is needed for subsequent motion estimation/compensation, an inverse quantizer (376) performs inverse quantization on the quantized spectral data coefficients. An inverse frequency transformer (366) then performs the inverse of the operations of the frequency transformer (360), producing a reconstructed prediction residual (for a predicted frame) or a reconstructed key frame. If the current frame (305) was a key frame, the reconstructed key frame is taken as the reconstructed current frame (not shown). If the current frame (305) was a predicted frame, the reconstructed prediction residual is added to the motion-compensated current frame (335) to form the reconstructed current frame. The frame store (320) buffers the reconstructed current frame for use in predicting the next frame. In some embodiments, the encoder applies a deblocking filter to the reconstructed frame to adaptively smooth discontinuities in the blocks of the frame.

The entropy coder (380) compresses the output of the quantizer (370) as well as certain side information (e.g., motion information (315), quantization step size). Typical entropy coding techniques include arithmetic coding, differential coding, Huffman coding, run length coding, LZ coding, dictionary coding, and combinations of the above. The entropy coder (380) typically uses different coding techniques for different kinds of information (e.g., DC coefficients, AC coefficients, different kinds of side information), and can choose from among multiple code tables within a particular coding technique.

The entropy coder (380) puts compressed video information (395) in the buffer (390). A buffer level indicator is fed back to bitrate adaptive modules. The compressed video information (395) is depleted from the buffer (390) at a constant or relatively constant bitrate and stored for subsequent streaming at that bitrate. Alternatively, the encoder system (300) streams compressed video information immediately following compression.

Before or after the buffer (390), the compressed video information (395) can be channel coded for transmission over the network. The channel coding can apply error detection and correction data to the compressed video information (395).

B. Video Decoder

FIG. 4 is a block diagram of a general video decoder system (400). The decoder system (400) receives information (495) for a compressed sequence of video frames and produces output including a reconstructed frame (405). Particular embodiments of video decoders typically use a variation or supplemented version of the generalized decoder (400).

The decoder system (400) decompresses predicted frames and key frames. For the sake of presentation, FIG. 4 shows a path for key frames through the decoder system (400) and a path for forward-predicted frames. Many of the components of the decoder system (400) are used for compressing both key frames and predicted frames. The exact operations performed by those components can vary depending on the type of information being compressed.

A buffer (490) receives the information (495) for the compressed video sequence and makes the received information available to the entropy decoder (480). The buffer (490) typically receives the information at a rate that is fairly constant over time, and includes a jitter buffer to smooth short-term variations in bandwidth or transmission. The buffer (490) can include a playback buffer and other buffers as well. Alternatively, the buffer (490) receives information at a varying rate. Before or after the buffer (490), the compressed video information can be channel decoded and processed for error detection and correction.

The entropy decoder (480) entropy decodes entropy-coded quantized data as well as entropy-coded side information (e.g., motion information, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (480) frequently uses different decoding techniques for different kinds of information (e.g., DC coefficients, AC coefficients, different kinds of side information), and can choose from among multiple code tables within a particular decoding technique.

If the frame (405) to be reconstructed is a forward-predicted frame, a motion compensator (430) applies motion information (415) to a reference frame (425) to form a prediction (435) of the frame (405) being reconstructed. For example, the motion compensator (430) uses a macroblock motion vector to find a macroblock in the reference frame (425). A frame buffer (420) stores previous reconstructed frames for use as reference frames. Alternatively, a motion compensator applies another type of motion compensation. The prediction by the motion compensator is rarely perfect, so the decoder (400) also reconstructs prediction residuals.

When the decoder needs a reconstructed frame for subsequent motion compensation, the frame store (420) buffers the reconstructed frame for use in predicting the next frame. In some embodiments, the encoder applies a deblocking filter to the reconstructed frame to adaptively smooth discontinuities in the blocks of the frame.

An inverse quantizer (470) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (460) converts the quantized, frequency domain data into spatial domain video information. For block-based video frames, the inverse frequency transformer (460) applies an inverse transform described in the following sections. In some embodiments, the inverse frequency transformer (460) applies an inverse frequency transform to blocks of spatial prediction residuals for key frames. The inverse frequency transformer (460) can apply an 8×8, 8×4, 4×8, or other size inverse frequency transforms.

2. Conditional Lapped Transform

Figure 1:
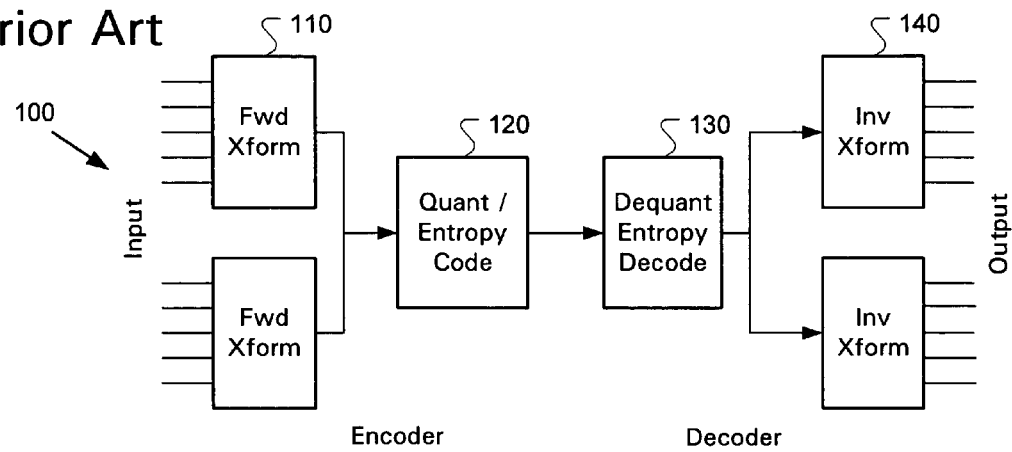
FIG. 1 is a block diagram of a typical transform coding technique in the prior art.
Figure 2:
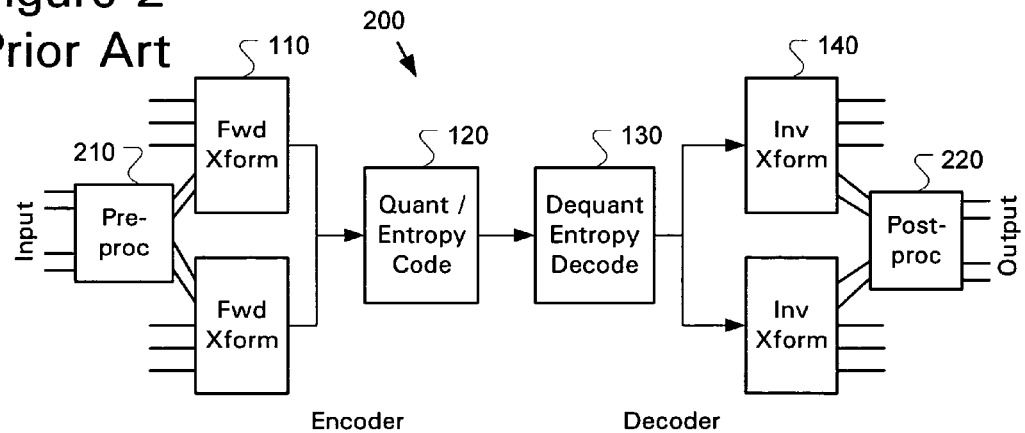
FIG. 2 is a block diagram of an encoding/decoding system based on the spatial domain lapped transform in the prior art.

With reference again to FIG. 2, the pre-process and post-process filter stages 210, 220 are applied to all adjacent block edges of an image when the typical prior spatial-domain lapped transform is performed on the image by an encoder/decoder 200. An image of size M×N pixels, coded using 8×8 blocks, has nearly M*N/32 distinct edges between adjacent 8×8 blocks for its luminance channel alone. Where the prior art encoder/decoder 200 applies the spatial-domain lapped transform to an image, the filter stages 210, 220 are applied to each of these adjacent block edges of the image.

A. Overlap Mode Signaling Per Adjacent Block Edge

Figure 5:
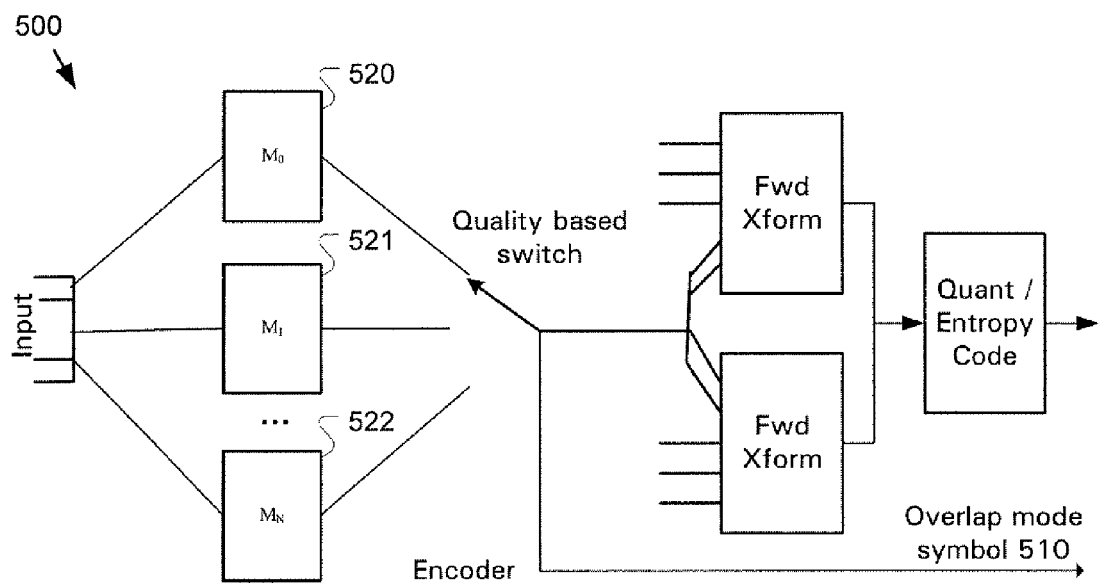
FIG. 5 is a block diagram of an encoder implementing the conditional lapped transform with per adjacent block edge overlap mode signaling.

In a first implementation of the conditional lapped transform shown in FIG. 5, the encoder sends a distinct symbol (overlap mode symbol 510) corresponding to each adjacent block edge, defining the choice of overlap filter ($M_n$) 520-522 (which may be a pass through filter, i.e. no filtering being applied), as shown in FIG. 5 for the encoder. At the encoder, the choice of filter can be made based on various criteria, including whether any filter results are out of range, a smoothness test, a rate distortion optimization criteria, and combinations of these criteria, among others. This switch is referred to as the "mode" of overlap filter, and the mode determines a "condition" under which the pre and post filters are applied. FIG. 5 shows an overlap mode parameter that determines the switch setting, being sent for each block edge being filtered.

One disadvantage of allowing for each pre and post filter to be independently flagged is the increase in overhead associated with the filtering mode. For example, assume that video of size 320×240 is being encoded at 30f/s. Further, assume that one I-frame (Intra-coded frame) is sent every second. There are thus around 3600 8×8 I-frame block edges in the video every second. (This number is approximate, because some blocks may be at image boundaries, and thus are not adjacent block edges). Even when a single bit overlap mode symbol (a 1 bit overhead) is sent for each edge, this results in an excess bitrate of 3.6 kbps in the coded bitstream (compressed video information 395 of FIG. 3), which is not insignificant.

B. Bit-Rate Based and Per Block Overlap Mode Signaling

In another example implementation, the codec achieves a lower overhead for signaling the overlap mode using a signaling scheme that is based on the coding bit-rate and uses a per block overlap mode symbol. This signaling scheme utilizes the following syntax elements: a frame-level quantization parameter (QP), a frame-level overlap flag, and a macro-block level overlap mode flag. In codecs using other video coding syntax, the conditional overlap transform mode for individual block edges, or groups of block edges, can be encoded using other syntax schemes and elements.

For example, another syntax element related to the coding bit-rate or quantization of the frame can be used.

Figure 6:
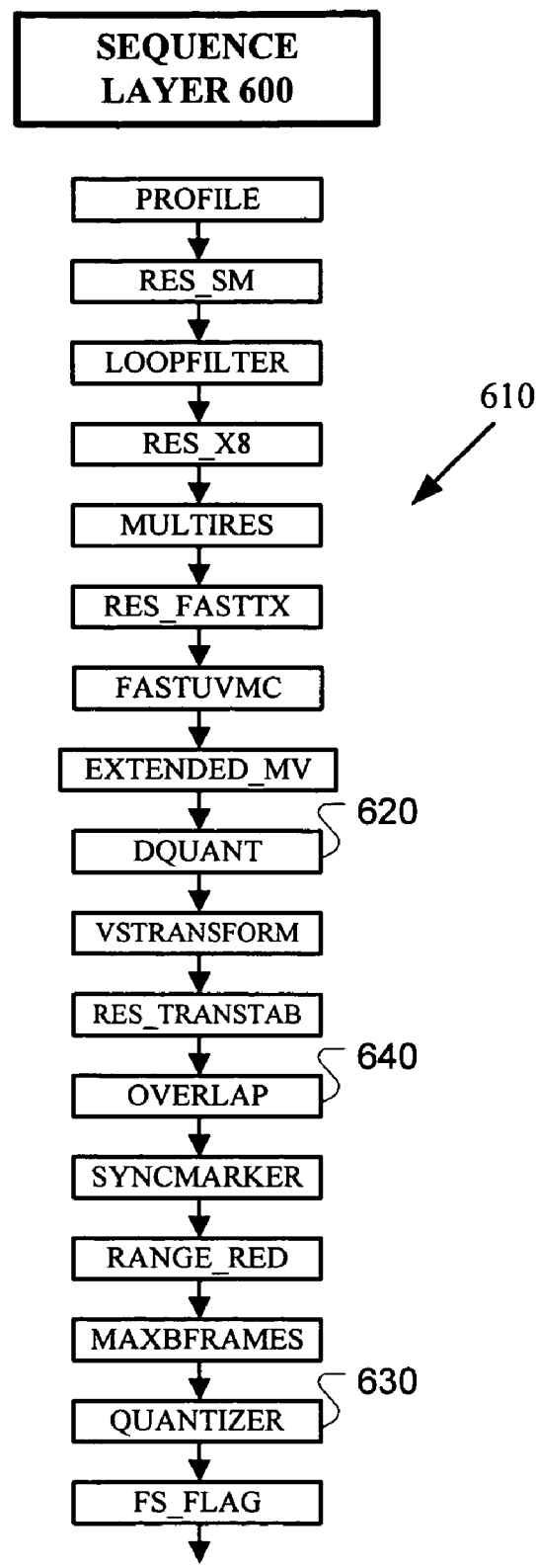
FIG. 6 is a sequence-level syntax diagram utilized in an encoder/decoder according to a second implementation of the conditional lapped transform with bit-rate based and per macroblock overlap mode signaling.
Figure 7:
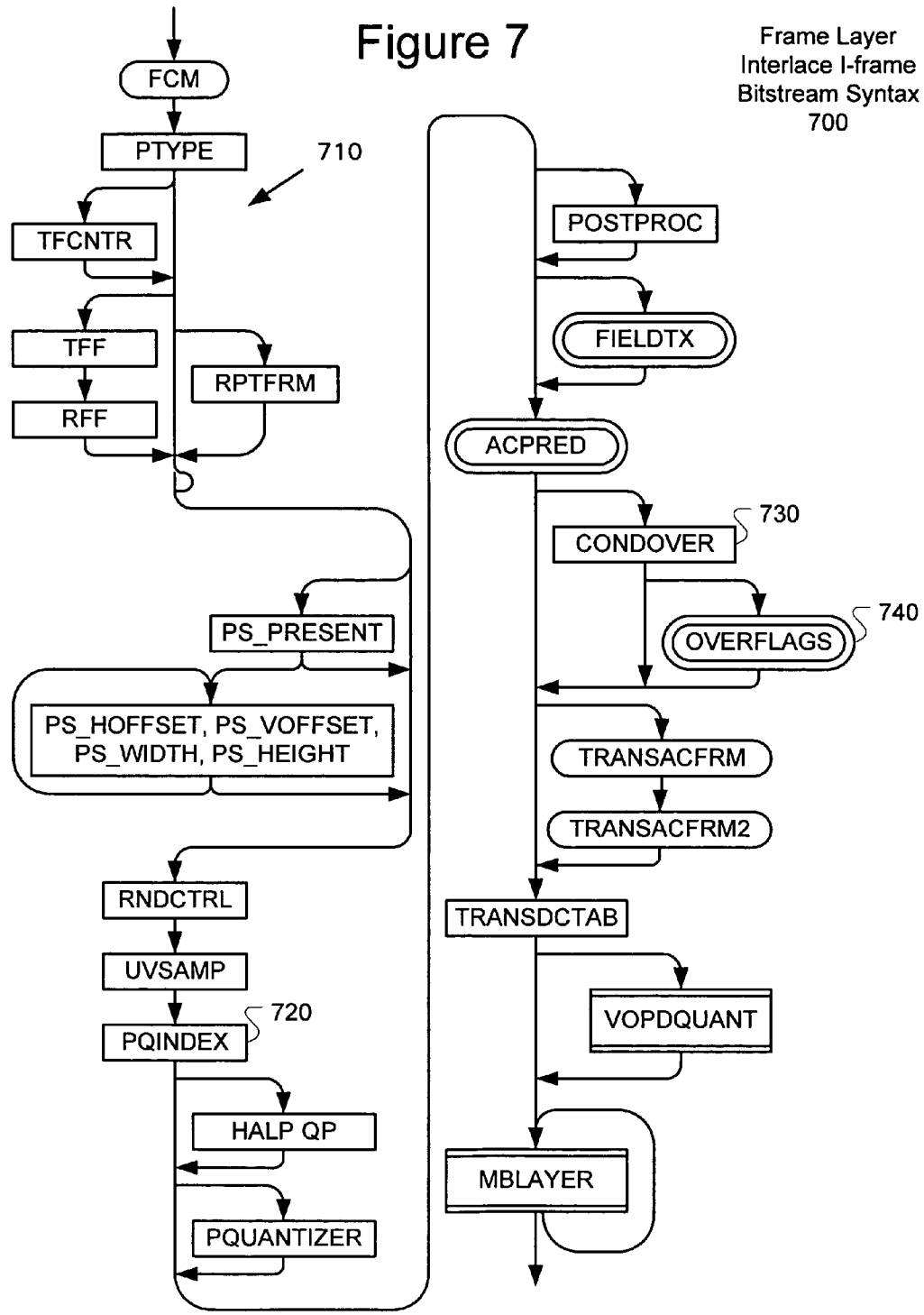
FIG. 7 is a frame-level syntax diagram utilized in the encoder/decoder according to a second implementation of the conditional lapped transform with bit-rate based and per macroblock overlap mode signaling.

With reference to FIGS. 6 and 7, the compressed video bitstream 195 (FIG. 3) includes information for a sequence of compressed progressive video frames or other pictures. The bitstream is organized into several hierarchical layers that are decoded by a decoder such as the decoder (400) of FIG. 4. The highest layer is the sequence layer, which has information for the overall sequence of frames. Additionally, each compressed video frame is made up of data that is structured into three hierarchical layers. From top to bottom the layers are: picture, macroblock, and block.

FIG. 6 is a syntax diagram for the sequence layer 600, which includes a sequence header 610 followed by data for the picture layer (see FIG. 7). The sequence header 610 includes several sequence-level elements that are processed by the decoder and used to decode the sequence, including a macroblock quantization (DQUANT) element 620, quantizer specifier (QUANTIZER) element 630, and overlapped transform flag (OVERLAP) element 640. DQUANT 620 is a 2-bit field that indicates whether or not the quantization step size can vary within a frame. There are three possible values for DQUANT. If DQUANT=0, then the only one quantization step size (i.e. the frame quantization step size) can be used per frame. If DQUANT=1 or 2, then it is possible to quantize each of the macroblocks in the frame differently.

The QUANTIZER 630 is a 2-bit fixed length code ["FLC"] field that indicates the quantizer used for the sequence. The quantizer types are encoded according to the following Table 1.

TABLE 1

Quantizer Specification

| FLC | Quantizer specification |
|---|---|
| 00 | Quantizer implicitly specified at frame level |
| 01 | Quantizer explicitly specified at frame level |
| 10 | 5 QP deadzone quantizer used for all frames |
| 11 | 3 QP deadzone quantizer used for all frames |

Overlapped Transform Flag (OVERLAP) (1 Bit)

The OVERLAP 640 is a 1-bit flag that indicates whether overlapped transforms are used, as discussed further below. If OVERLAP=1, then overlapped transforms are used, otherwise they are not used.

FIG. 7 is a syntax diagram for the picture layer 700 for an interlace intra-coded frame ["interlace I-frame"]. Syntax diagrams for other pictures, such as progressive I-frames, P-pictures and B-frames have many similar syntax elements. The picture layer 700 includes a picture header 710 followed by data for the macroblock layer. The picture header 710 includes several picture-level elements that are processed by the decoder and used to decode the corresponding frame. Some of those elements are only present if their presence is signaled or implied by a sequence-level element or a preceding picture-level element.

In the illustrated bistream syntax, the frame-level quantization parameter (QP) is in the form of a picture quantizer scale (PQUANT), which can be signaled implicitly or explicitly in the picture layer syntax, as specified by the sequence-level syntax element, QUANTIZER described above. In either case, the picture quantizer scale (PQUANT) is translated from a picture quantizer index (PQINDEX) element 720. PQINDEX 720 is a 5-bit field that signals the quantizer scale index for the entire frame. It is present in all picture types. If the implicit quantizer is used then PQINDEX specifies both the picture quantizer scale (PQUANT) and the quantizer (3QP or 5QP deadzone) used for the frame. Table 2 shows how PQINDEX is translated to PQUANT and the quantizer for implicit mode.

TABLE 2

PQINDEX to PQUANT/Quantizer Deadzone Translation (Implicit Quantizer)

| PQINDEX | PQUANT | Quantizer Deadzone |
|---|---|---|
| 0 | NA | NA |
| 1 | 1 | 3 QP |
| 2 | 2 | 3 QP |
| 3 | 3 | 3 QP |
| 4 | 4 | 3 QP |
| 5 | 5 | 3 QP |
| 6 | 6 | 3 QP |
| 7 | 7 | 3 QP |
| 8 | 8 | 3 QP |
| 9 | 6 | 5 QP |
| 10 | 7 | 5 QP |
| 11 | 8 | 5 QP |
| 12 | 9 | 5 QP |
| 13 | 10 | 5 QP |
| 14 | 11 | 5 QP |
| 15 | 12 | 5 QP |
| 16 | 13 | 5 QP |
| 17 | 14 | 5 QP |
| 18 | 15 | 5 QP |
| 19 | 16 | 5 QP |
| 20 | 17 | 5 QP |
| 21 | 18 | 5 QP |
| 22 | 19 | 5 QP |
| 23 | 20 | 5 QP |
| 24 | 21 | 5 QP |
| 25 | 22 | 5 QP |
| 26 | 23 | 5 QP |
| 27 | 24 | 5 QP |
| 28 | 25 | 5 QP |
| 29 | 27 | 5 QP |
| 30 | 29 | 5 QP |
| 31 | 31 | 5 QP |

If the quantizer is signaled explicitly at the sequence or frame level then PQINDEX is translated to the picture quantizer step size PQUANT as indicated by Table 3.

TABLE 3

PQINDEX to PQUANT Translation (Explicit Quantizer)

| PQINDEX | PQUANT 3QP Deadzone | PQUANT 5QP Deadzone |
|---|---|---|
| 0 | NA | NA |
| 1 | 1 | 1 |
| 2 | 2 | 1 |
| 3 | 3 | 1 |
| 4 | 4 | 2 |
| 5 | 5 | 3 |
| 6 | 6 | 4 |
| 7 | 7 | 5 |
| 8 | 8 | 6 |
| 9 | 9 | 7 |
| 10 | 10 | 8 |
| 11 | 11 | 9 |
| 12 | 12 | 10 |
| 13 | 13 | 11 |
| 14 | 14 | 12 |
| 15 | 15 | 13 |
| 16 | 16 | 14 |
| 17 | 17 | 15 |
| 18 | 18 | 16 |
| 19 | 19 | 17 |
| 20 | 20 | 18 |
| 21 | 21 | 19 |
| 22 | 22 | 20 |
| 23 | 23 | 21 |
| 24 | 24 | 22 |
| 25 | 25 | 23 |
| 26 | 26 | 24 |
| 27 | 27 | 25 |
| 28 | 28 | 26 |
| 29 | 29 | 27 |
| 30 | 30 | 29 |
| 31 | 31 | 31 |

Alternatively, instead of the translation shown in Table 3, PQUANT is equal to PQINDEX for all values of PQINDEX from 1 through 31 when the quantizer is signaled explicitly at the sequence or frame level.

The picture header further includes a conditional overlap flag (CONDOVER) element 730 and conditional overlap macroblock pattern flags (OVERFLAGS) element 740. This Conditional Overlap Flag element is present only in I pictures, and only when OVERLAP is on and PQUANT is within a certain range, as discussed further below. The OVERFLAGS syntax element is present only in I pictures, and only when CONDOVER has the binary value 11. OVERFLAGS is coded as a bitplane, which in raw mode requires that each macroblock carry its local information, OVERFLAGMB.

Overlap Mode Rules

In this second example implementation of the conditional lapped transform, the encoder (FIG. 5) limits the overhead by placing some restrictions on the overlap mode flag in intra-frames, as listed below:

1. The overlap mode is set to be a binary quantity. Value FALSE indicates that overlap filtering is not applied (i.e., the pre- and post-filters are pass through filters) and TRUE indicates that overlap filtering stages are applied as defined for the spatial-domain lapped transform in the Improved SDLT Patent Application referenced above. In other implementations, the number of overlap filter modes can be larger as illustrated in FIG. 5, at the cost of additional overhead per macroblock.

2. For a certain values of a frame-based quantization parameter (QP) (e.g., the picture quantizer scale (PQUANT) determined from table 2 or 3) greater than a quantization threshold (QTH) or QP>QTH (i.e. for low to very low bitrates), the overlap condition is set to TRUE for all edges between intra blocks. In the illustrated implementation, a quantization threshold of 8 is used, but alternative implementations can use a different quantization threshold.

3. Otherwise, for a certain frame based quantization parameter values QP≦QTH (i.e., for high to very high bitrates), each intra macroblock in a frame is associated with a binary overlap mode flag. The overlap filter rules associated with this flag are enumerated ahead.

For intra-blocks and macroblocks in predictive-coded frames (P-frames), the overlap mode is implicitly derived from the quantization parameter (QP) alone. This is reasonable, since P frames allow for a greater degree of freedom in choice of coding mode than do I frames.

Figure 8:
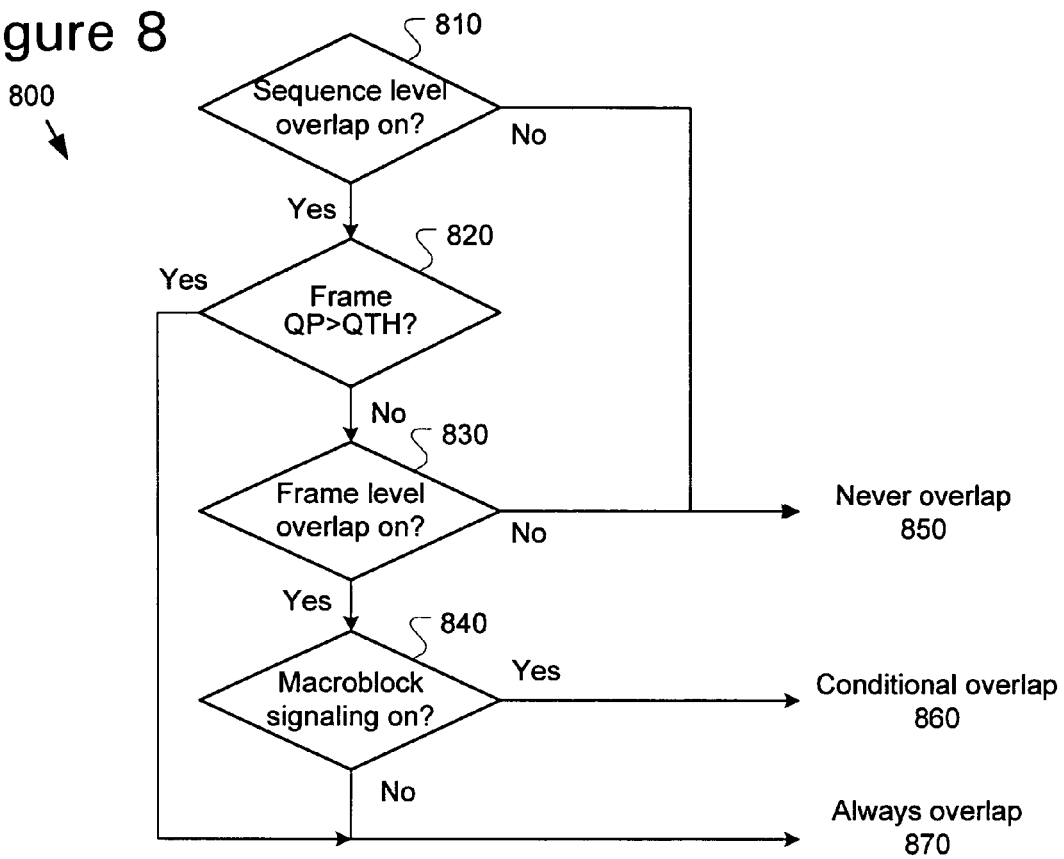
FIG. 8 is a flow diagram illustrating bit-rate based and per macroblock signaling of the overlap mode flag in a second implementation of the conditional lapped transform.

As shown in the flow diagram of FIG. 8, the overlap mode flag is encoded and decoded in this second implementation as follows:

1. No overlap mode is sent, and no overlap performed (850) if the sequence level overlap flag (OVERLAP 640 in FIG. 6) at first decision block 810 is set to FALSE.
2. The overlap mode flag is implicitly TRUE when QP>QTH at decision block 820, and the sequence level overlap flag (OVERLAP 640) is TRUE at decision block 810. In this case, overlap is performed for all adjacent block edges in the picture (870).
3. When QP≦QTH at decision block 820, a frame level flag (CONDOVER 730 in FIG. 7) indicating one of three possibilities (a, b or c) is sent, and operations carried out as indicated:
   a. No overlap for frame (850)
   b. All macroblocks overlapped in frame (870)
   c. "Conditional overlap"—per macroblock overlap mode flags (OVERFLAGS 740 in FIG. 7) sent (860).

This is broken out into two binary decisions in the flow diagram for ease of understanding.

4. When conditional overlap is indicated, the overlap mode flag is a binary flag that is sent for each intra macroblock in an intra frame (i.e., the OVERFLAGS syntax element).

Conditional Overlap

Figure 9:
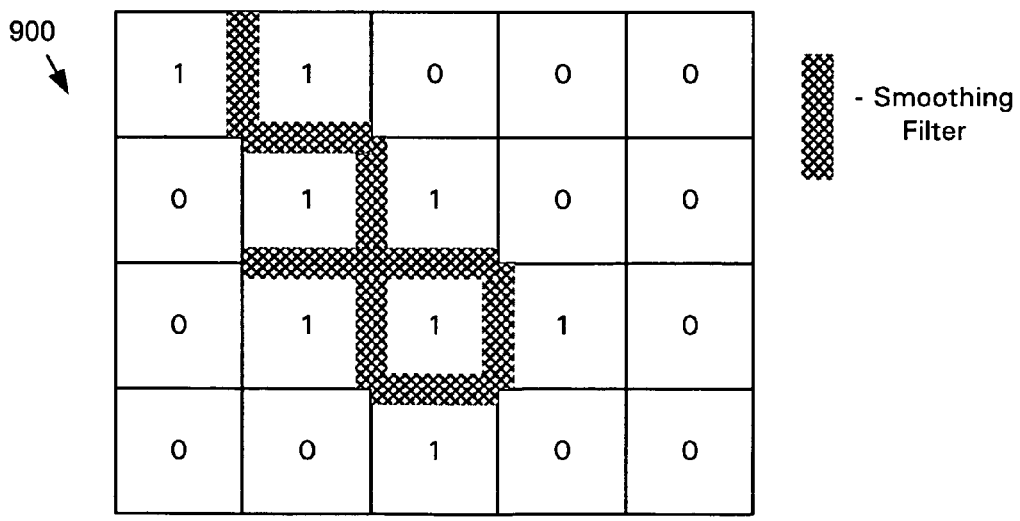
FIG. 9 is a diagram illustrating the adjacent macroblock edges to which the overlap filter is applied for an example of signaled overlap mode flags for a set of macroblocks in an image.

Since the overlap mode is signaled per macroblock, multiple edges are referenced by each conditional overlap flag. In the illustrated implementation, the macroblock size is 16×16 pixels (for the luminance channel), and the transform block size is 8×8 pixels. The chrominance channel has half the spatial resolution for 8×8 block size. Accordingly, the edges may be internal to a macroblock (i.e., the edges between each of the transform blocks in a macroblock for the luminance channel), or straddling two macroblocks (for around half the luminance channel edges, and all chrominance channel edges). As illustrated by the example overlap mode flags signaled for the macroblocks illustrated in FIG. 9, the rules to determine whether or not to apply the pre/post filter to an edge are enumerated below:

1. No pre or post filtering is applied to the internal macroblock edges of a macroblock whose overlap mode flag is FALSE, or a macroblock which is non-intra-coded.
2. All internal 8×8 intra block edges in a macroblock are pre/post filtered if the macroblock is intra coded, and the corresponding overlap mode flag is TRUE.
3. The 8×8 block edges straddling two macroblocks are filtered only if
   a. The two 8×8 block edges are intra blocks, and
   b. Both overlap mode flags of the two macroblocks are TRUE.

Overlap Mode Signaling

All macroblocks of intra frames in this second illustrated implementation of the conditional lapped transform are intra. Since the overlap mode is sent based on the frame level quantization parameter QP, the overlap mode flag is sent either for all macroblocks, or for no macroblocks. When it is sent for all macroblocks, the overlap mode flags constitute a bitplane of size (M/16)*(N/16) for an M×N image (M, N assumed to be multiples of 16).

The illustrated conditional lapped transform implementation uses an efficient coding mechanism (called "bitplane" coding, described below) to send the per macroblock overlap mode flags. This relies on the assumption that the bitplane representation of the overlap mode flags has a high degree of spatial correlation—i.e., adjacent bits in the vertical or horizontal direction are equal valued with high probability. This assumption is found to be true for the overlap flag—it is reasonable to expect that for real-world images and video, there is sufficient spatial continuity that is apparent in the overlap mode flags as well.

The bitplane coding mechanism (described more fully below) is used to encode overlap mode signaling for intra frames. The overlap mode flags for the entire frame are joint coded at the frame level using one of a collection of tilings and code tables, except for the case where they are encoded "raw" as one bit per macroblock sent together with the macroblock header.

Bitplane Coding

In bitplane coding, macroblock-specific binary information such as the per macroblock conditional overlap flags, may be encoded in one binary symbol per macroblock. In these cases, the status for all macroblocks in a field or frame may be coded as a bitplane and transmitted in the field or frame header. One exception for this rule is if the bitplane coding mode is set to Raw Mode, in which case the status for each macroblock is coded as one bit per symbol and transmitted along with other macroblock level syntax elements at the macroblock level.

Field/frame-level bitplane coding is used to encode two-dimensional binary arrays. The size of each array is rowMB×colMB, where rowMB and colMB are the number of macroblock rows and columns, respectively, in the field or frame in question. Within the bitstream, each array is coded as a set of consecutive bits. One of seven modes is used to encode each array. The seven modes are:

1. Raw mode—information coded as one bit per symbol and transmitted as part of MB level syntax;
2. normal-2 mode—two symbols coded jointly;
3. differential-2 mode—differential coding of the bitplane, followed by coding two residual symbols jointly;
4. normal-6 mode—six symbols coded jointly;
5. differential-6 mode—differential coding of the bitplane, followed by coding six residual symbols jointly;
6. rowskip mode—one bit skip to signal rows with no set bits; and
7. columnskip mode—one bit skip to signal columns with no set bits.

The syntax elements for a bitplane at the field or frame level are in the following sequence: INVERT, IMODE, and DATABITS.

Invert Flag (INVERT)

The INVERT syntax element is a 1-bit value, which if set indicates that the bitplane has more set bits than zero bits. Depending on INVERT and the mode, the decoder shall invert the interpreted bitplane to recreate the original. Note that the value of this bit shall be ignored when the raw mode is used. Description of how the INVERT value is used in decoding the bitplane is provided below.

Coding Mode (IMODE)

The IMODE syntax element is a variable length value that indicates the coding mode used to encode the bitplane. Table 4 shows the code table used to encode the IMODE syntax element. Description of how the IMODE value is used in decoding the bitplane is provided below.

TABLE 4

IMODE VLC Code table

| IMODE VLC | Coding mode |
| --- | --- |
| 10 | Norm-2 |
| 11 | Norm-6 |
| 010 | Rowskip |
| 011 | Colskip |
| 001 | Diff-2 |
| 0001 | Diff-6 |
| 0000 | Raw |

Bitplane Coding Bits (DATABITS)

The variable syntax element is variable sized syntax element that encodes the stream of symbols for the bitplane. The method used to encode the bitplane is determined by the value of IMODE. The seven coding modes are described in the following sections.

Raw Mode

In this mode, the bitplane is encoded as one bit per symbol scanned in the raster-scan order of macroblocks, and sent as part of the macroblock layer. Alternatively, the information is coded in raw mode at the field or frame level and DATABITS is rowMB×colMB bits in length.

Normal-2 Mode

If rowMB×colMB is odd, the first symbol is encoded raw. Subsequent symbols are encoded pair wise, in natural scan order. The binary VLC table in Table 5 is used to encode symbol pairs.

TABLE 5

Norm-2/Diff-2 Code Table

| Symbol 2n | Symbol 2n + 1 | Codeword |
| --- | --- | --- |
| 0 | 0 | 0 |
| 1 | 0 | 100 |
| 0 | 1 | 101 |
| 1 | 1 | 11 |

Diff-2 Mode

The Normal-2 method is used to produce the bitplane as described above, and then the $Diff^1$ operation is applied to the bitplane as described below.

Normal-6 Mode

In the Norm-6 and Diff-6 modes, the bitplane is encoded in groups of six pixels. These pixels are grouped into either 2×3 or 3×2 tiles. The bitplane is tiled maximally using a set of rules, and the remaining pixels are encoded using a variant of row-skip and column-skip modes. 2×3 "vertical" tiles are used if and only if rowMB is a multiple of 3 and colMB is not. Otherwise, 3×2 "horizontal" tiles are used. For a plane tiled with linear tiles along the top and left edges of the picture, the coding order of the tiles follows the following pattern. The 6-element tiles are encoded first, followed by the column-skip and row-skip encoded linear tiles. If the array size is a multiple of 2×3 or of 3×2, the latter linear tiles do not exist and the bitplane is perfectly tiled.

The 6-element rectangular tiles are encoded using an incomplete prefix code, i.e., a prefix code which does not use all end nodes for encoding. Let N be the number of set bits in the tile, i.e. $0 \leq N \leq 6$. For $N \leq 3$, a VLC is used to encode the tile. For N=3, a fixed length escape is followed by a 5 bit fixed length code, and for N>3, a fixed length escape is followed by the code of the complement of the tile.

The rectangular tile contains 6 bits of information. Let k be the code associated with the tile, where $k = b_i \, 2^i$, $b_i$ is the binary value of the $i^{th}$ bit in natural scan order within the tile. Hence $0 \leq k < 64$. A combination of VLCs and escape codes plus fixed length codes is used to signal k.

Diff-6 Mode

The Normal-6 method is used to produce the bitplane as described above, and then the $Diff^1$ operation is applied to the bitplane as described below.

Rowskip Mode

In the rowskip coding mode, all-zero rows are skipped with one bit overhead. The syntax is as follows: for each row, a single ROWSKIP bit indicates if the row is skipped; if the row is skipped, the ROWSKIP bit for the next row is next; otherwise (the row is not skipped), ROWBITS bits (a bit for each macroblock in the row) are next. Thus, if the entire row is zero, a zero bit is sent as the ROWSKIP symbol, and ROWBITS is skipped. If there is a set bit in the row, ROWSKIP is set to 1, and the entire row is sent raw (ROWBITS). Rows are scanned from the top to the bottom of the field or frame.

Columnskip Mode

Columnskip is the transpose of rowskip. Columns are scanned from the left to the right of the field or frame.

$Diff^1$:: Inverse Differential Decoding

If either differential mode (Diff-2 or Diff-6) is used, a bitplane of "differential bits" is first decoded using the corresponding normal modes (Norm-2 or Norm-6 respectively). The differential bits are used to regenerate the original bitplane. The regeneration process is a 2-D DPCM on a binary alphabet. In order to regenerate the bit at location (i, j), the predictor $b_p(ij)$ is generated as follows (from bits b(i, j) at positions (i, j)):

$$b_p(i, j) = \begin{cases} A & i = j = 0, \text{ or } b(i, j-1) \neq b(i-1, j) \\ b(0, j-1) & i = 0 \\ b(i-1, j) & \text{otherwise} \end{cases}$$

For the differential coding mode, the bitwise inversion process based on INVERT is not performed. However, the INVERT flag is used in a different capacity to indicate the value of the symbol A for the derivation of the predictor shown above. More specifically, A equal to 0 if INVERT equals to 0 and A equals to 1 if INVERT equals to 1. The actual value of the bitplane is obtained by xor'ing the predictor with the decoded differential bit value. In the above equation, b(i,j) is the bit at the i,jth position after final decoding (i.e. after doing Norm-2/Norm-6, followed by differential x or with its predictor).

Example Overlap Filter

In one example overlap filter mode used in the second implementation of the conditional lapped transform, the overlap smoothing is carried out on the unclamped 16 bit reconstruction at the decoder when signaled. This is necessary because the forward process associated with overlap smoothing may result in range expansion beyond the permissible 9 bit range for pixel values. The result of overlap smoothing is clamped down to 9 bits, in line with the remainder of the pixels not touched by overlap smoothing.

Vertical edges (pixels a0, a1, b1, b0 in the above example) are filtered first, followed by the horizontal edges (pixels p0, p1, q1, q0). The intermediate result following the first stage of filtering (vertical edge smoothing) is stored in 16 bit. The core filters applied to the four pixels straddling either edge are given below:

$$\begin{pmatrix} y_0 \\ y_1 \\ y_2 \\ y_3 \end{pmatrix} = \left( \begin{pmatrix} 7 & 0 & 0 & 1 \\ -1 & 7 & 1 & 1 \\ 1 & 1 & 7 & -1 \\ 1 & 0 & 0 & 7 \end{pmatrix} \begin{pmatrix} x_0 \\ x_1 \\ x_2 \\ x_3 \end{pmatrix} + \begin{pmatrix} r_0 \\ r_1 \\ r_0 \\ r_1 \end{pmatrix} \right) >> 3$$

The original pixels being filtered are (x0, x1, x2, x3). r0 and r1 are rounding parameters, which take on alternating values of 3 and 4 to ensure statistically unbiased rounding. The original values are filtered by the matrix with entries that are clearly easy to implement. These values, after adding the rounding factors, are bit shifted by three bits to give the filtered output (y0, y1, y2, y3).

For both horizontal and vertical edge filters, the rounding values are r0=4, r1=3 for odd-indexed columns and rows respectively, assuming the numbering within a block to start at 1. For even-indexed columns/rows, r0=3 and r1=4. Filtering is defined as an in-place 16 bit operation—thus the original pixels are overwritten after smoothing. For vertical edge filtering, the pixels (a0, a1, b1, b0) correspond to (x0, x1, x2, x3), which in turn get filtered to (y0, y1, y2, y3). Likewise, for horizontal edge filtering, the correspondence is with (p0, p1, q1, q0) respectively.

Pixels in the 2×2 corner of a block, are filtered in both directions. The order of filtering determines their final values, and therefore it is important to maintain the order—vertical edge filtering followed by horizontal edge filtering—for bit exactness. Conceptually, clamping is to be performed subsequent to the two directional filtering stages, on all pixels that are filtered. However, there may be some computational advantage to combining clamping with filtering—this is an implementation issue as long as it is done carefully to generate the correct output.

3. Computing Environment

The above described implementations of the conditional lapped transform can be performed on any of a variety of devices in which image and video signal processing is performed, including among other examples, computers; image and video recording, transmission and receiving equipment; portable video players; video conferencing; Web video streaming applications; and etc. The image and video coding techniques can be implemented in hardware circuitry (e.g., in circuitry of an ASIC, FPGA, etc.), as well as in image and video processing software executing within a computer or other computing environment (whether executed on the central processing unit (CPU), or dedicated graphics processor, video card or like), such as shown in FIG. 10.

Figure 10:
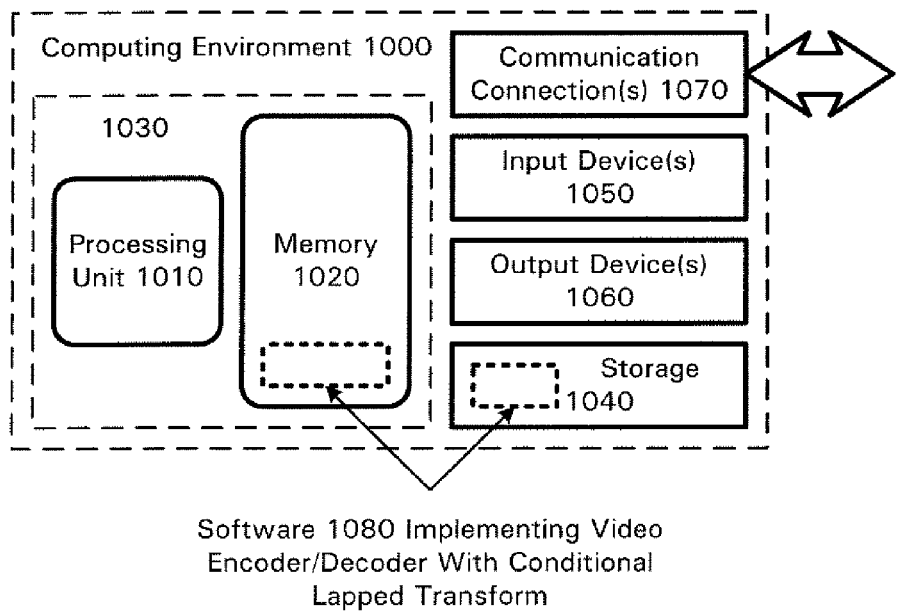
FIG. 10 is a block diagram of a suitable computing environment for the video encoder/decoder of FIGS. 3 and 4.

FIG. 10 illustrates a generalized example of a suitable computing environment (1000) in which the described conditional lapped transform may be implemented. The computing environment (1000) is not intended to suggest any limitation as to scope of use or functionality of the invention, as the present invention may be implemented in diverse general-purpose or special-purpose computing environments.

With reference to FIG. 10, the computing environment (1000) includes at least one processing unit (1010) and memory (1020). In FIG. 10, this most basic configuration (1030) is included within a dashed line. The processing unit (1010) executes computer-executable instructions and may be a real or a virtual processor. In a multi-processing system, multiple processing units execute computer-executable instructions to increase processing power. The memory (1020) may be volatile memory (e.g., registers, cache, RAM), non-volatile memory (e.g., ROM, EEPROM, flash memory, etc.), or some combination of the two. The memory (1020) stores software (1080) implementing the described conditional lapped transform.

A computing environment may have additional features. For example, the computing environment (1000) includes storage (1040), one or more input devices (1050), one or more output devices (1060), and one or more communication connections (1070). An interconnection mechanism (not shown) such as a bus, controller, or network interconnects the components of the computing environment (1000). Typically, operating system software (not shown) provides an operating environment for other software executing in the computing environment (1000), and coordinates activities of the components of the computing environment (1000).

The storage (1040) may be removable or non-removable, and includes magnetic disks, magnetic tapes or cassettes, CD-ROMs, CD-RWs, DVDs, or any other medium which can be used to store information and which can be accessed within the computing environment (1000). The storage (1040) stores instructions for the software (1080) implementing the audio encoder that that generates and compresses quantization matrices.

The input device(s) (1050) may be a touch input device such as a keyboard, mouse, pen, or trackball, a voice input device, a scanning device, or another device that provides input to the computing environment (1000). For audio, the input device(s) (1050) may be a sound card or similar device that accepts audio input in analog or digital form, or a CD-ROM reader that provides audio samples to the computing environment. The output device(s) (1060) may be a display, printer, speaker, CD-writer, or another device that provides output from the computing environment (1000).

The communication connection(s) (1070) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The transform and coding/decoding techniques herein can be described in the general context of computer-readable media. Computer-readable media are any available media that can be accessed within a computing environment. By way of example, and not limitation, with the computing environment (1000), computer-readable media include memory (1020), storage (1040), and combinations of any of the above.

The conditional lapped transform herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of transform coding/decoding digital media content, comprising:
   transform coding/decoding blocks of the digital media content;
   signaling the overlap filter mode from encoder to decoder of the digital media content on a per macroblock basis, wherein the overlap mode signaling is a per macroblock overlap flag; and
   conditionally applying an overlap filter to a subset of edges between adjacent transform blocks of the digital media content before/after transform coding/decoding on a spatially varying basis;
   wherein conditionally applying an overlap filter comprises:
      switching between a plurality of overlap filter modes applied to edges between adjacent transform blocks of the digital media content on the spatially varying basis having macroblock-level granularity;
      applying the overlap filter to intra-macroblock transform block edges of a macroblock whose overlap flag signals to apply the overlap filter; and
      applying the overlap filter to transform block edges between adjacent macroblocks both of whose overlap flags signal to apply the overlap filter.

2. The method of claim 1 wherein the method further comprises: restricting the switching the overlap filter mode based on a bit-rate related parameter.

3. The method of claim 2 wherein the bit-rate related parameter is a frame-level quantization parameter.

4. A method of decoding a coded video bitstream, comprising:
   decoding block data of a plurality of encoded blocks of a frame in the coded video bitstream;
   performing dequantization of the decoded block data;
   performing an inverse transform of transform blocks of the decoded block data:
   determining an overlap mode for groups of more than one adjacent transform block edge from at least one syntax element of the coded video bitstream, wherein the at least one syntax element comprises a set of overlap mode flags having macroblock granularity;
   switching between plural overlap filters according to the determined overlap mode for a group; and
   applying the respective overlap filter to the group, further comprising:
      applying the respective overlap filter to intra-macroblock transform block edges of a macroblock whose overlap flag signals to apply the respective overlap filter;
      applying the respective overlap filter to transform block edges between adjacent macroblocks both of whose overlap flags signal to apply the respective overlap filter.

5. The method of claim 4 wherein the at least one syntax element comprises a syntax element relating to a bit rate of the coded video bitstream.

6. The method of claim 5 wherein the syntax element relating to a bit rate of the coded video bitstream is a frame level quantization parameter.

7. The method of claim 4 wherein the set of overlap mode flags is encoded using bitplane coding.

8. The method of claim 4 wherein the at least one syntax element comprises a frame-level overlap parameter, a frame-based bi-rate related parameter, and a spatially varying mode parameter, the method further comprising:
   if the bit-rate related parameter indicates a low bit rate, determining to apply an overlap filter to the adjacent transform block edges within the frame;
   else if the frame-level overlap parameter specifies no overlap, determining to apply a no-overlap filter to the adjacent transform block edges within the frame;
   else if the frame-level overlap parameter specifies conditional overlap, determining to apply the overlap filter specified by the spatially varying mode parameter of a group to the adjacent transform block edges within the group; and
   else, determining to apply the overlap filter to the adjacent transform block edges within the frame.

9. The method of claim 8 wherein the a least one syntax element further comprises a sequence-level overlap parameter, the method further comprising:
   if the sequence-level overlap parameter of a sequence specifies no overlap, determining to apply the no-overlap filter to the adjacent transform block edges within all frames of the sequence.

10. A method of decoding a video bitstream coded using a conditional lapped transform, the method comprising:
    determining an overlap condition having at least a no overlap state in which no overlap filter is applied to adjacent transform block edges, and an overlap state in which an overlap filter is applied to adjacent transform block edges, wherein the overlap condition varies spatially over pictures in a video sequence; and
    applying the overlap filter to adjacent transform block edges when the overlap condition is in the overlap state;
    wherein the overlap condition is signaled in the video bitstream by a per macro-block overlap flag, and said applying further comprises:
       applying the overlap filter to intra-macroblock transform block edges of a macroblock whose overlap condition is signaled to be in the overlap state;
       applying the overlap filter to transform block edges between adjacent macroblocks both of whose overlap conditions are signaled o be in the overlap state.

11. The method of claim 10 further comprising: restricting the determining and applying the overlap filter based on a bit-rate related parameter.

12. The method of claim 11 wherein the bit-rate related parameter is a frame-level quantization parameter.

13. At least one computer-readable program carrying medium encoded with software thereon that is executable by a processing unit to perform a method of coding/decoding a video bitstream coded using a conditional lapped transform, the method comprising:
    determining an overlap condition having at least a no overlap state in which no overlap filter is applied to adjacent transform block edges, and an overlap state in which an overlap filter is applied to adjacent transform block edges, wherein the overlap condition varies spatially over pictures in a video sequence; and applying the overlap filter to adjacent transform block edges when the overlap condition is in the overlap state;

wherein the overlap condition is signaled in the video bitstream by a per macro-block overlap flag, and said applying further comprises:

applying the overlap filter to intra-macroblock transform block edges of a macroblock whose overlap condition is signaled to be in the overlap state;

applying the overlap filter to transform block edges between adjacent macroblocks both of whose overlap conditions are signaled to be in the overlap state.

14. The at least one computer-readable medium of claim 13 wherein the method further comprises:

restricting the determining and applying the overlap filter based on a bit-rate related parameter.

15. The at least one computer-readable medium of claim 14 wherein the bit-rate related parameter is a frame-level quantization parameter.

* * * * *

UNITED STATES PATENT AND TRADEMARK OFFICE
CERTIFICATE OF CORRECTION

PATENT NO. : 7,369,709 B2
APPLICATION NO. : 10/931885
DATED : May 6, 2008
INVENTOR(S) : Pohsiang Hsu et al.

Page 1 of 1

It is certified that error appears in the above-identified patent and that said Letters Patent is hereby corrected as shown below:

In column 17, line 50, in Claim 4, after "data" delete ":" and insert -- ; --, therefor.

In column 18, line 11, in Claim 8, delete "bi-rate" and insert -- bit-rate --, therefor.

In column 18, line 59, in Claim 13, after "computer-readable" delete "program carrying".

Signed and Sealed this
Twelfth Day of April, 2011

David J. Kappos
*Director of the United States Patent and Trademark Office*